United States Patent [19] [11] 4,216,980
Shreve [45] Aug. 12, 1980

[54] SAFETY SHIELD FOR FLANGED PIPE COUPLING

[75] Inventor: Marshall T. Shreve, Sulphur, La.

[73] Assignee: Martec Industries Inc., Sulphur, La.

[21] Appl. No.: 953,455

[22] Filed: Oct. 23, 1978

[51] Int. Cl.² .............................................. F16L 55/00
[52] U.S. Cl. ........................................ 285/13; 285/45; 285/93
[58] Field of Search ...................... 285/13, 45, 293, 93

[56] References Cited

U.S. PATENT DOCUMENTS

| | | | |
|---|---|---|---|
| 2,699,960 | 1/1955 | Callery et al. | 285/45 X |
| 2,708,123 | 5/1955 | Risley et al. | 285/45 |
| 3,113,790 | 12/1963 | Matthiessen | 285/45 |
| 3,597,263 | 8/1971 | Bancroft et al. | 285/93 |
| 3,738,383 | 6/1973 | David | 285/45 X |
| 3,850,451 | 11/1974 | Matthiessen | 285/45 X |
| 3,887,221 | 6/1975 | Young | 285/DIG. 12 X |

Primary Examiner—Thomas F. Callaghan
Attorney, Agent, or Firm—Vinson & Elkins

[57] ABSTRACT

A safety shield for a pipe coupling flange comprising an elongated, flexible strip of polytetrafluoroethylene (PTFE) adaptable to be wrapped around the circumference of the flange, and having a length somewhat greater than the circumference of the flange. The elongated, flexible strip of PTFE is of sufficient width to allow the longitudinal edge portions to be folded over the edges of the flanges and against the outer faces of the flange. The longitudinal edge portion is segmented to allow overlap of the segmented sections, and further, the segmented sections have means therein to allow passage therethrough of a PTFE lace for securing the safety shield onto the flange.

13 Claims, 3 Drawing Figures

SAFETY SHIELD FOR FLANGED PIPE COUPLING

BACKGROUND OF THE INVENTION

1. Field of the Invention

The invention relates to a safety shield for flanged pipe couplings. In particular, the safety shield of the invention is constructed so as to be resistant to corrosive chemicals.

2. Prior Art

Flange shields are commonly used for interrupting leakage from pipe joints. They are especially useful if the piped fluid is under pressure and the seal in a flanged coupling ruptures. In such event, the safety shield on the flange prevents spraying or splashing of the piped liquid in the vicinity of the pipe coupling. This is particularly important if the liquid is corrosive or otherwise dangerous on contact to workmen in the vicinity.

Others have made developments in this field. However, to date, these developments have utilized glass cloth, aluminized asbestos and other cloth-like materials to construct the shields, the shields utilizing these materials have been stitched, bonded or sewn together. In practice these materials tend to trap the harmful liquids within the folds and creases of the material. If the material is absorbent, the liquid is absorbed by the material. In either event, workmen replacing the shield become exposed unnecessarily to these dangerous liquids. In fact, these shields are considered to be sacrificial. That is, they are expected to remain unitary just long enough to prevent accidental splashing of nearby workers.

Workers must then carefully remove the contaminated remains without exposing themselves to the hazardous chemical which attacked the shield. If the leak is stopped before the shield is destroyed, the leaking chemical becomes trapped in the folds and layers of the material creating a potential hazard to workers removing same.

These materials deteriorate when exposed to ultraviolet light, resulting in embrittlement and cracking.

Typical of patents in this field is U.S. Pat. No. 3,850,451 to Roy Matthiessen, which claims a safety shield, for flanged pipe couplings, having a strip of aluminized or glass fiber cloth, with one or more liner strips secured within the shield strip. The shield is secured to the flange with a metal wire whose ends are twisted together.

Another Mattiessen patent in this field is U.S. Pat. No. 3,113,790, which utilizes a sheet of metal, spacing rods, and a plurality of flange sections cut into the longitudinal edge of the shield. While in the specification the patentee states that a suitable synthetic resinous composition could be used, the entire specification's teaching is directed to the use of metal in constructing the shield (see FIGS. 1-6).

Neither device provides adequate protection to workers exposed to corrosive liquids, which would tend to destroy the materials used in these two, cited patents. If not destroyed, the glass fibers tend to trap the liquid within its particular construction, usually corroding the wires securing it to the flange.

SUMMARY OF THE INVENTION

The present invention is directed to a safety shield for a pipe coupling flange comprising an elongated, flexible translucent strip of a fluoroalkene polymeric material, adaptable to be wrapped around the circumference of said pipe coupling flange, having a length somewhat greater than the circumference of said flanges, and having surfficient width to permit the longitudinal edges of the shield to be folded toward and approach the outside diameter of a pipe received in the flange, said longitudinal edges being segmented so that when the shield is wrapped around the flange a portion of each segment overlaps a portion of the segment juxtaposed thereto, and a plurality of the segments having means for receiving a pliable lace therethrough for securing the shield in a fixed position on the flange, the lace being derived from a fluoroalkene polymeric material. A reinforcing member may be used in conjunction with the safety shield by placing a strip of fluoroalkene polymer between the flange and the shield. It may be desirable to use some means of detecting fluid leakage, such as a chemical indicator placed in association with the shield so that the indicator may contact the fluid if the flange develops a leak.

A primary object of this invention is to provide a safety shield for pipe coupling flanges which is vastly more resistant to sunlight and corrosive chemicals than prior art shields.

Another object of the invention is to provide a flange safety shield which permits a controlled release of fluid leaking from the shielded flange while preventing the splashing or spraying of the fluid onto nearby workers or equipment.

Yet another object is to provide a flange safety shield that does not absorb within its structure fluid which has escaped from a shielded flange.

An additional object is to provide a flange safety shield which is reusable.

Another object is to provide a flange safety shield which is translucent and thus providing means for visual observation of fluid escaping from the shielded flange.

DESCRIPTION OF THE DRAWINGS

For a more complete understanding of the present invention reference is made to the following description in conjunction with the accompanying drawing in which.

DESCRIPTION OF THE PREFERRED EMBODIMENTS

Figure 3:
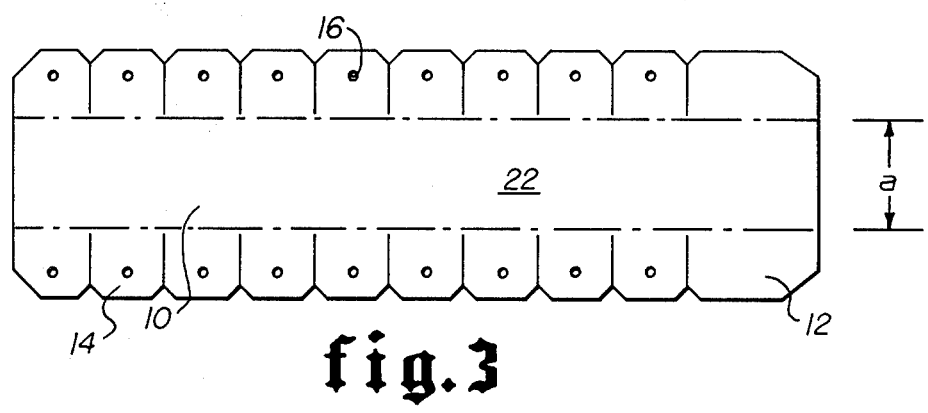
FIG. 3 is a top plan view of the safety shield, showing the longitudinal segments with holes for lacing the shield in place with a PTFE lace that would extend longitudinally through the holes.

The safety shield 22 is illustrated in FIG. 3 and comprises a wrap-around portion 10 and longitudinal segments 14 which extend along the longitudinal edges of the shield 22. There is provided in essentially each segment 14 a hole 16.

Figure 1:
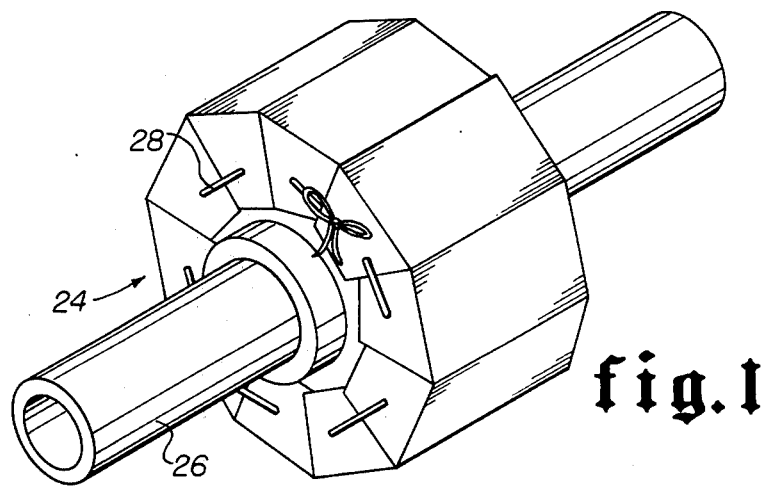
FIG. 1 is a perspective view of the safety shield of the invention secured to a flanged coupling of a pipe.

When the shield 22 is placed on and wrapped around a pipe flange, as illustrated in FIG. 1, a lace 28, that has been run through the holes 16 on each edge of the shield 22, may be drawn tight and tied off to hold the shield on to the flange. The laces, or strips, used in the invention are preferably made from flexible polytetrafluoroethylene. Thus, the lace is as resistant to corrosive environments as the shield.

It is preferred that the longitudinal segments 14 overlap a portion one another, as illustrated in FIG. 1, in order to prevent rapid passage of the piped fluid between the adjacent edges of the segments 14. The segment 12 on at least one end of the shield would not normally have a hole therethrough. The end segment 12 portion of the shield should be laid first on the flange, followed by wrapping the remainder of the shield 22 around the flange.

Thus, if the proper length of shield 22 is being used on the flange, the last laid portion of the shield 22 overlaps the first laid portion, preferably covering a length at least to cover the end segment 12. This provides an essentially splash-free assembly of the shield 22 once the segmental sides of the shield are folded over the side faces of the flange and tied off. Fluid being conducted through pipe 26 which escapes from the flange coupling would be deflected inside the shield and allowed to escape slowly from the shield.

In addition, upon disassembly of the shield for maintenance, the deflected liquid could be drained off. Due to the non-absorbant nature of the polytetrafluoroethylene (PTFE) shield 22, handling of the shield 22 should not present a hazard to the worker removing same.

Figure 2:
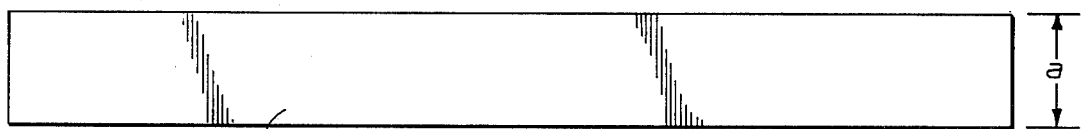
FIG. 2 is a top plan view of a liner strip which could be wrapped around the circumference of a flange prior to applying the safety shield.

In some applications it may be advisable to employ an elongated insert 20 between the flange circumference and the shield as a reinforcing member. Such insertions illustrated in FIG. 2, having a width "a". This width "a" is preferably essentially the same as the width "a" of the main body of the shield 22.

However, it is not necessary to always use the insert 20. When it is used, the insert 20 is wrapped around the circumference of the flange prior to application of the shield 22 thereto. As can be seen in the drawings, it is preferable, but not necessary, that insert 20 be somewhat longer than shield 22.

As a safety measure, certain compounds can be incorporated into or applied to the insert 20 that change color upon contact with the liquid transported through pipe 26. Thus, if a leak occurs in the flange, the strip will change to the preselected color. Because the shield 22 is a white, translucent material the color could be detected therethrough by visual inspection. A worker would be forewarned prior to disassembly and removal of the safety shield 22.

Unlike the "insert" used in the device described and claimed in U.S. Pat. No. 3,850,451, the insert 20 of the present invention is not attached to or made an integral part of the shield 22. The present combination of shield 22 and insert 20 is much simpler in construction and application.

Another method which can be used with the present invention to detect escaping fluid comprises use of a chemical indicator placed between the shield 22 and the flange. Color changes would be detectable through the translucent shield. Typically, such indicators are impregnated onto litmus paper to indicate contact with acid or base materials. Other indicator strips can be used to detect different chemicals.

The use of polytetrafluoroethylene is constructing the flange safety shields of the invention provides a device that resists destructive effects of sunlight and chemicals. The shield 22, lace 28 and reinforcing member 20 are all preferably made from polytetrafluoroethylene. This polymer may be obtained from E. I. duPont de Nemours under the name Teflon.

There are other fluoroalkenes which are essentially inert to corrosive chemicals and ultraviolet light which would be equally suitable in the present invention. The primary criteria would be that the shield 22 and lace 28 be flexible and pliable enough to be used as described and claimed herein and resist cracking or tearing when in normal use.

It has been found that use of the Teflon material in constructing the safety shield permits reuse of the shield about five times. The prior art shields could never be reused once they had been exposed to the escaping fluid. Also, it was found that after the prior art shields had been in place for a period of time, exposed to the elements, they were unsafe for reuse.

Other modifications of this invention will be readily apparent from the foregoing description of several preferred embodiments and it should be understood that the true scope of this invention is defined by the appended claims.

What is claimed is:

1. A safety shield for a flanged pipe coupling comprising an elongated, flexible translucent strip of a fluoroalkene polymeric material, adaptable to be wrapped around the circumference of the pipe coupling flanges having a length somewhat greater than the circumference of said flanges, and having sufficient width to permit the longitudinal edges of the shield to be folded toward and approach in a non-sealing manner the outside diameter of a pipe received in the flange, said longitudinal edges being segmented so that when the shield is wrapped around said flanges a portion of each segment overlaps a portion of the segment juxtaposed thereto, permitting escape therebetween of a measured amount of fluid that might leak from said pipe coupling, and a plurality of the segments having means receiving a pliable lace therethrough for securing the shield in a fixed position on the flanges said lace being derived from a fluoroalkene polymeric material.

2. The safety shield of claim 1, wherein said shield is made from a flexible strip of polytetrafluoroethylene.

3. The safety shield of claim 1, wherein said shield lace is derived from polytetrafluoroethylene.

4. The safety shield of claim 1, wherein each of said longitudinal segments has a hole therethrough for receiving the lace whereby the shield may be secured to the flanged pipe coupling with one end of the shield in an overlapped relation to the other.

5. The safety shield of claim 1, wherein there is means associated with said shield for indicating leakage of a piped fluid, passing through said flanged pipe coupling, said means being responsive to contact with said piped fluid.

6. The safety shield of claim 5 wherein said leakage indicating means is a chemical indicator.

7. The safety shield of claim 6 wherein said indicator is carried out by means which may be inserted between said flanges and said shield when the shield is placed upon said flanges.

8. A safety system for intercepting fluid exiting a flanged pipe coupling comprising:
   (a) a safety shield comprising an elongated, flexible, translucent strip of a fluoroalkene polymeric material, adaptable to be wrapped around the circumference of the pipe coupling flanges in a non-sealing manner, having a length somewhat greater than the circumference of said flanges, and having sufficient width to permit the longitudinal edges of the shield to be folded toward and approach the outside diameter of a pipe received in the flange, said longitudinal edges being segmented so that when the shield is wrapped around said flanges a portion of each segment overlaps a portion of the segment juxtaposed thereto, permitting escape of a measured amount of fluid that might leak from said pipe coupling, and a plurality of the segments having means receiving a pliable lace therethrough for securing the shield in a fixed position on the flanges, said lace being derived from a fluoroalkene polymeric material, and (b) a reinforcing member interposed between said flange and said safety shield having essentially the same, or somewhat greater, length as the safety shield and a width essentially equal to the width of said flanges, and being derived from a fluoroalkene polymeric material.

9. The safety system of claim 8, wherein both the safety shield and the reinforcing member are made from polytetrafluoroethylene.

10. The safety system of claim 8, wherein the lace is made from polytetrafluoroethylene and each of said longitudinal segments has a hole therethrough for receiving the lace, whereby the shield may be secured to the flanged pipe coupling with one end of the shield in an overlapped relation to the other.

11. The safety system of claim 8, wherein there is means associated with said safety shield and reinforcing member for indicating leakage of a piped fluid, passing through said flanged pipe coupling, said means being responsive to contact with said piped fluid.

12. The safety system of claim 11, wherein said leakage indicating means is compounded with said reinforcing member.

13. The safety system of claim 11, wherein said leakage indicating means is a chemical indicator, and, when used in conjunction with said safety system, is positioned in a manner to provide observation thereof through the safety shield.

* * * * *